US012732646B2

(12) United States Patent
Chui

(10) Patent No.: US 12,732,646 B2
(45) **Date of Patent: *Sep. 8, 2026**

(54) RENDERING A MODELED SCENE

(71) Applicant: Outward, Inc., San Jose, CA (US)

(72) Inventor: Clarence Chui, Los Altos Hills, CA (US)

(73) Assignee: Outward, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,422

(22) Filed: Apr. 25, 2024

(65) Prior Publication Data

US 2024/0380931 A1 Nov. 14, 2024

Related U.S. Application Data

(63) Continuation of application No. 17/840,465, filed on Jun. 14, 2022, now Pat. No. 12,003,790, which is a continuation of application No. 16/565,421, filed on Sep. 9, 2019, now Pat. No. 11,405,663, which is a continuation of application No. 14/525,143, filed on Oct. 27, 2014, now Pat. No. 10,462,499, which is a continuation-in-part of application No. 14/068,977, filed on Oct. 31, 2013, now Pat. No. 10,013,804.

(60) Provisional application No. 61/895,943, filed on Oct. 25, 2013, provisional application No. 61/720,857, filed on Oct. 31, 2012.

(51) Int. Cl.

| | |
|---|---|
| ***H04N 21/234*** | (2011.01) |
| ***H04N 21/44*** | (2011.01) |
| ***H04N 21/84*** | (2011.01) |

(52) U.S. Cl.

CPC . *H04N 21/23418* (2013.01); *H04N 21/23412* (2013.01); *H04N 21/44012* (2013.01); *H04N 21/84* (2013.01)

(58) Field of Classification Search

CPC ....... H04N 21/23418; H04N 21/23412; H04N 21/44012; H04N 21/84

See application file for complete search history.

(56) References Cited

U.S. PATENT DOCUMENTS

| | | | |
|---|---|---|---|
| 5,941,944 | A | 8/1999 | Messerly |
| 6,377,257 | B1 | 4/2002 | Borrel |
| 6,654,414 | B1 | 11/2003 | Narayanaswami |

(Continued)

FOREIGN PATENT DOCUMENTS

| | | |
|---|---|---|
| EP | 1113669 | 7/2001 |
| WO | 2012048456 | 4/2012 |

OTHER PUBLICATIONS

Park et al., 'Mixed Reality Based Interactive 3D Story Composition Tool', TIDSE 2006, 181-186.

*Primary Examiner* — Yu Chen

(74) *Attorney, Agent, or Firm* — Van Pelt, Yi & James LLP

(57) ABSTRACT

Techniques for rendering a scene are disclosed. In some embodiments, a scene definition is modified to generate a modified scene definition based at least in part on a current state of a local database at a device. The modified scene definition is constrained to include references to objects locally available in the local database, and at least one object referenced in the scene definition is substituted with a different object in the modified scene definition that is locally available in the local database. The scene is rendered at the device according to the modified scene definition.

51 Claims, 5 Drawing Sheets

(56) References Cited

U.S. PATENT DOCUMENTS 6,912,293 B1 6/2005 Korobkin
7,007,295 B1 2/2006 Rose
7,199,836 B1 4/2007 Eleftheriadis
7,839,422 B2 11/2010 Agarwala
8,165,342 B2 4/2012 Reed
8,429,699 B2 4/2013 Rodriguez
8,678,929 B1* 3/2014 Nishimura ............ A63F 13/798 463/31
8,817,021 B1 8/2014 Hickman
8,965,906 B1 2/2015 Werth
2001/0056477 A1 12/2001 Mcternan
2002/0013897 A1 1/2002 Mcternan
2002/0080143 A1* 6/2002 Morgan .................. G06T 17/00 345/581
2002/0154133 A1 10/2002 Dery
2004/0098236 A1 5/2004 Mayer
2005/0002571 A1 1/2005 Hiraga
2005/0105555 A1 5/2005 Oshima
2005/0171964 A1 8/2005 Kulas
2005/0267893 A1 12/2005 Headd
2006/0217979 A1 9/2006 Pahud
2006/0256130 A1* 11/2006 Gonzalez .............. G06F 16/958 707/E17.116
2007/0005795 A1* 1/2007 Gonzalez ................ G06F 16/40 375/E7.006
2007/0162568 A1 7/2007 Gupta
2007/0192818 A1 8/2007 Bourges-Sevenier
2007/0214476 A1 9/2007 Zalewski
2008/0071559 A1 3/2008 Arrasvuori
2008/0120534 A1 5/2008 Moore
2008/0228825 A1 9/2008 Basso
2009/0064257 A1 3/2009 Oehm
2009/0089186 A1 4/2009 Paolini
2009/0144137 A1 6/2009 Moulton
2009/0149233 A1 6/2009 Strause
2009/0165140 A1 6/2009 Robinson
2009/0167787 A1 7/2009 Bathiche
2009/0189974 A1 7/2009 Deering
2009/0254572 A1 10/2009 Redlich
2010/0095236 A1 4/2010 Silberstein
2010/0149399 A1 6/2010 Mukai
2010/0157063 A1 6/2010 Basso
2010/0177104 A1 7/2010 Dufour
2010/0246605 A1 9/2010 Taylor
2010/0285884 A1 11/2010 Gauer, III
2010/0289835 A1 11/2010 Holub
2010/0310164 A1 12/2010 Reed
2011/0025689 A1 2/2011 Perez
2011/0050947 A1 3/2011 Marman
2011/0064388 A1 3/2011 Brown
2011/0110581 A1 5/2011 Yang
2011/0141141 A1 6/2011 Kankainen
2011/0169924 A1 7/2011 Haisty
2011/0169987 A1 7/2011 Gann
2011/0175923 A1 7/2011 Mahajan
2011/0181606 A1 7/2011 Sumner
2011/0182500 A1 7/2011 Esposito
2011/0279445 A1 11/2011 Murphy
2011/0279453 A1 11/2011 Murphy
2011/0292054 A1 12/2011 Boker
2012/0013644 A1 1/2012 Ichieda
2012/0020581 A1 1/2012 Zarom
2012/0021297 A1 1/2012 Hauser
2012/0059953 A1 3/2012 Klappert
2012/0069051 A1 3/2012 Hagbi
2012/0086727 A1 4/2012 Korah
2012/0140025 A1 6/2012 Friedman
2012/0173209 A1 7/2012 Krebs
2012/0194549 A1 8/2012 Osterhout
2012/0256915 A1 10/2012 Jenkins
2012/0256954 A1 10/2012 Soon-Shiong
2012/0300122 A1 11/2012 Liu
2012/0306876 A1 12/2012 Shotton
2013/0044184 A1 2/2013 Sophrin
2013/0167161 A1 6/2013 Liu
2013/0170557 A1 7/2013 Wang
2013/0215115 A1 8/2013 Jenkins
2013/0321574 A1 12/2013 Zhang
2013/0342564 A1* 12/2013 Kinnebrew ............ G09G 3/003 345/619
2013/0346566 A1 12/2013 Kwon
2014/0069224 A1 3/2014 Dimig
2014/0085314 A1 3/2014 Steinke
2014/0085479 A1 3/2014 Haas
2014/0150013 A1 5/2014 Fauqueur
2014/0168218 A1 6/2014 Mitrea
2014/0267309 A1 9/2014 Wilson
2018/0005453 A1 1/2018 Siddiqui

* cited by examiner

RENDERING A MODELED SCENE

CROSS REFERENCE TO OTHER APPLICATIONS

This application is a continuation of U.S. patent application Ser. No. 17/840,465, now U.S. Pat. No. 12,003,790, entitled RENDERING A MODELED SCENE filed Jun. 14, 2022, which is a continuation of U.S. patent application Ser. No. 16/565,421, now U.S. Pat. No. 11,405,663, entitled RENDERING A MODELED SCENE filed Sep. 9, 2019, which is a continuation of U.S. patent application Ser. No. 14/525,143, now U.S. Pat. No. 10,462,499, entitled RENDERING A MODELED SCENE filed Oct. 27, 2014, which claims priority to U.S. Provisional Patent Application No. 61/895,943 entitled VIDEO CONTENT PARTITIONING AND BROADCAST ARCHITECTURE filed Oct. 25, 2013 and which is a continuation in part of U.S. patent application Ser. No. 14/068,977, now U.S. Pat. No. 10,013,804, entitled DELIVERING VIRTUALIZED CONTENT filed Oct. 31, 2013, which claims priority to U.S. Provisional Patent Application No. 61/720,857 entitled RENDERING DIGITAL CONTENT filed Oct. 31, 2012, all of which are incorporated herein by reference for all purposes.

BACKGROUND OF THE INVENTION

Display roadmaps are rapidly transitioning from formats such as Full HD (1920×1080 pixels) to 4K UHD (3840×2160) as a consumer standard. The industry is also anticipating changes to even larger formats such as 8K UHD (7680×4320) within the next decade. However, the standards being defined for the UHD formats of video (up to 120 frames per second) will challenge available broadcasting and streaming bandwidth, particularly for wireless devices. The standards also challenge the industry's ability to produce input hardware (i.e., camera/video technologies) that matches up to the native output capability of the display hardware for the general consumer. High quality content creation for these new formats is not possible for the common user, and all video content captured prior to the UHD standards will not be natively compatible with display hardware in the near future. That is, the most common online content can never be viewed as a high quality experience with upcoming display hardware. Furthermore, imagers will lag display quality for the foreseeable future. Regardless, for amateur users, environmental/lighting conditions are typically not ideal for capturing high quality content. Moreover, less than ideal timing, shooting problems, spontaneous events, etc., also often reduce the quality of captured content.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
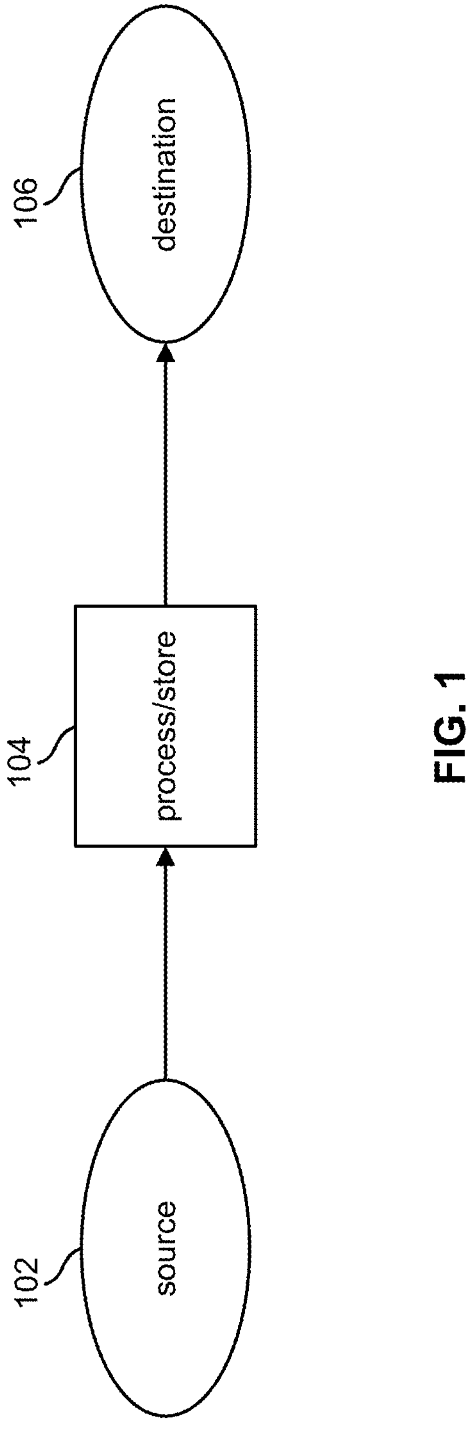
FIG. 1 is a high level block diagram illustrating an embodiment of typical stages associated with communicating content.

FIG. 1 is a high level block diagram illustrating an embodiment of typical stages associated with communicating content, such as image, video, or other multi-media content. At stage 102, source content is captured by a camera or other recording device. The format and quality of the source content is based on the capabilities and limitations of the recording device. At stage 104, the source content is processed and/or stored for immediate (i.e., real time) or later distribution. For example, the content processing of stage 104 may include content compression for easier storage and distribution. In some embodiments, as later described herein, the content processing of stage 104 comprises content conversion into a prescribed computational space. At stage 106, the content is delivered to and rendered at a destination device.

Typically, the quality of rendered content at a destination device is restricted by and does not exceed the quality of the source content despite the rendering capabilities of the destination device. However, the limitations of source content quality pose a growing challenge as rapid improvements occur in the hardware of destination devices. Poor quality source content is not suitable to serve the demands of HD (high definition) and emerging beyond-HD capable destination devices. Standard HD is quickly giving way to 2K HD, which will evolve into 4K HD. Moreover, hardware roadmaps already contemplate 8K HD, i.e., UHD (ultra high definition), which is approximately sixteen times the format size of standard HD.

Techniques for decoupling the format and quality of source content as well as the format and quality of the same content processed for storage and distribution from the rendering capabilities of a destination device are disclosed in detail herein. The disclosed multi-media technology platform facilitates flawless quality when rendering content from an arbitrary source on any of a plurality of types of destination devices by allowing performance up to the capability of the receiving system (including best-in-class display technologies) to be achieved. Thus, a high fidelity, cinematic quality viewing experience may be realized from any image or video source. The disclosed techniques not only allow users to create visually stunning image and video content anywhere, at any time, and on any device without having to be an expert in multi-media content creation tools but also allow users to re-imagine content in nearly unlimited ways. Although image or video source content is described in many of the given examples, the techniques disclosed herein may be extended to and employed with respect to any multi-media content.

Figure 2:
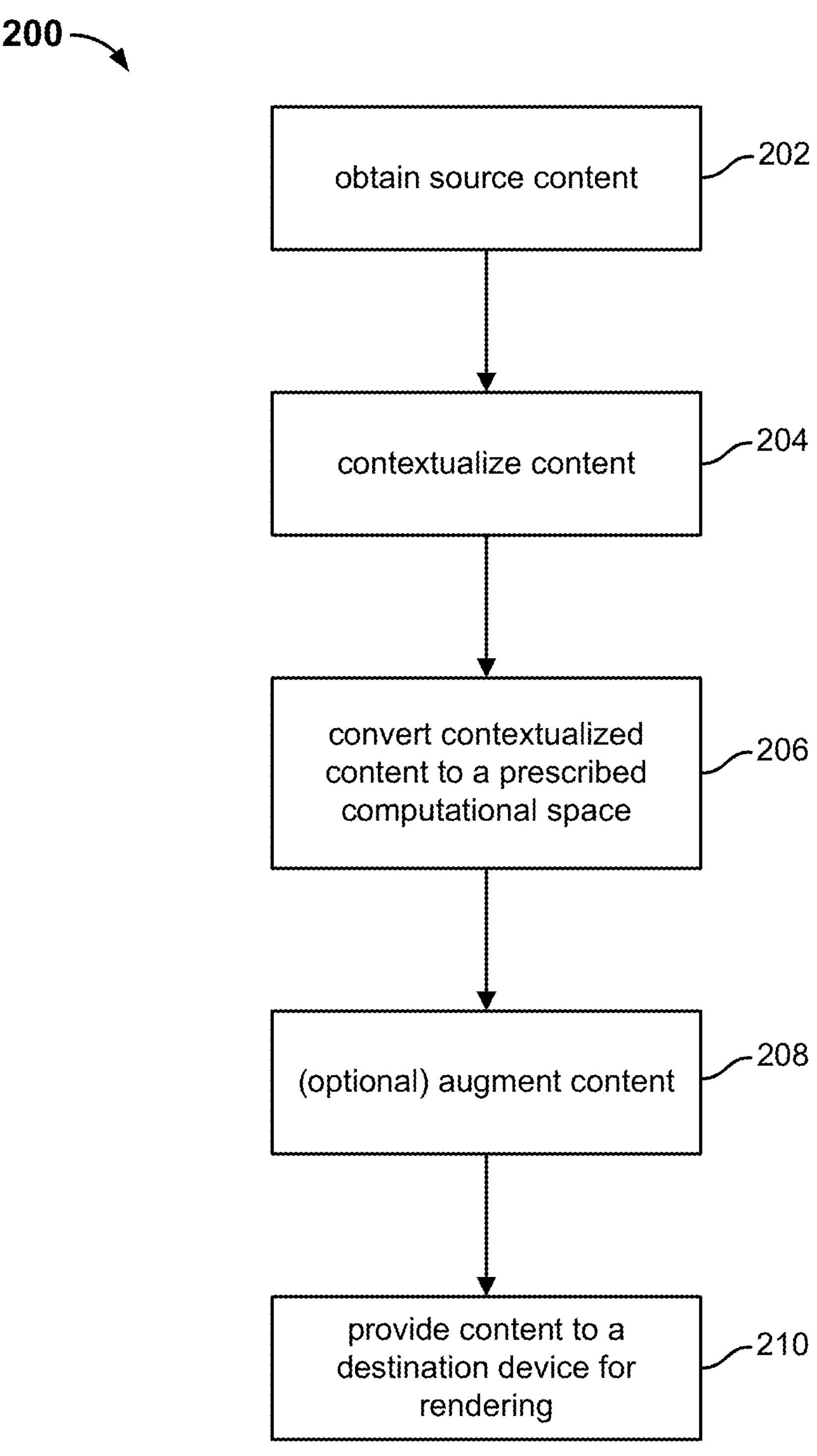
FIG. 2 is a flow chart illustrating an embodiment of a high level content distribution process based on context abstraction.

FIG. 2 is a flow chart illustrating an embodiment of a high level content distribution process based on context abstraction. At step 202, source content is obtained. For example, image or video content is obtained at step 202 from a device employed to capture the content and/or previously captured content is obtained from storage. At step 204, the content obtained at step 202 is contextualized. For example, one or more elements and/or characteristics of the context of the content are identified at step 204. At step 206, the contextualized content is converted to a prescribed, proprietary computational space. For example, elements and/or characteristics of the context of the content identified at step 204 are abstracted and transformed into object-based representations at step 206. Such object-based representations may be based on existing object assets residing in a database or cloud of assets. Alternatively, a new object representation may be determined and added to such a database or cloud. In some embodiments, the conversion of step 206 substantially, if not completely, virtualizes the source content such that little, if any, of the original source content (e.g., pixel and/or other data) is preserved when converted to the computational space based representation at step 206.

The content is optionally augmented at step 208. In most cases, the content is augmented to include at least one or more elements or features that were never a part of the original content obtained at step 202 but are included to provide an enhanced viewing experience at a destination device. At step 210, the content is provided to a destination device for rendering. Since the computational space is agnostic to the destination device, a perfect match for the capabilities of any destination device can be achieved using process 200. Thus, content may be rendered at a destination device based on the native format of the destination device as well as in the best quality supported by the destination device. For example, using process 200, source content captured via a relatively low resolution mobile phone camera may be rendered at a high resolution destination device in cinematic quality. In some embodiments, the content augmentation of step 208 may be performed client-side at a destination device.

As described, process 200 facilitates a high fidelity viewing experience regardless of the format or quality of the source content and offers unprecedented variability within the actually rendered content. The disclosed platform does not comprise merely compressing, upscaling, and/or replicating the appearance of source content. Rather, information gathered from contextual clues from the source content is employed to virtualize or create a re-imagined version of the content. In most cases, information is being added to, not removed from, the content. That is, more information than what is present in the original source content is provided for rendering at an output device. In many cases, the virtualized or re-imagined version of the source content comprises very little, if any, of the data comprising the original source content. Moreover, the content may be re-imagined differently for different output devices, for example, based on the rendering capabilities of the devices and/or other criteria associated with the devices. A key objective of the disclosed approach is not to create a lossless version of the source content, although that may coincidentally be an outcome, but rather to prioritize creation of content best suited for the capabilities of a destination device and/or customized for the destination device or a user thereof.

Figure 3:
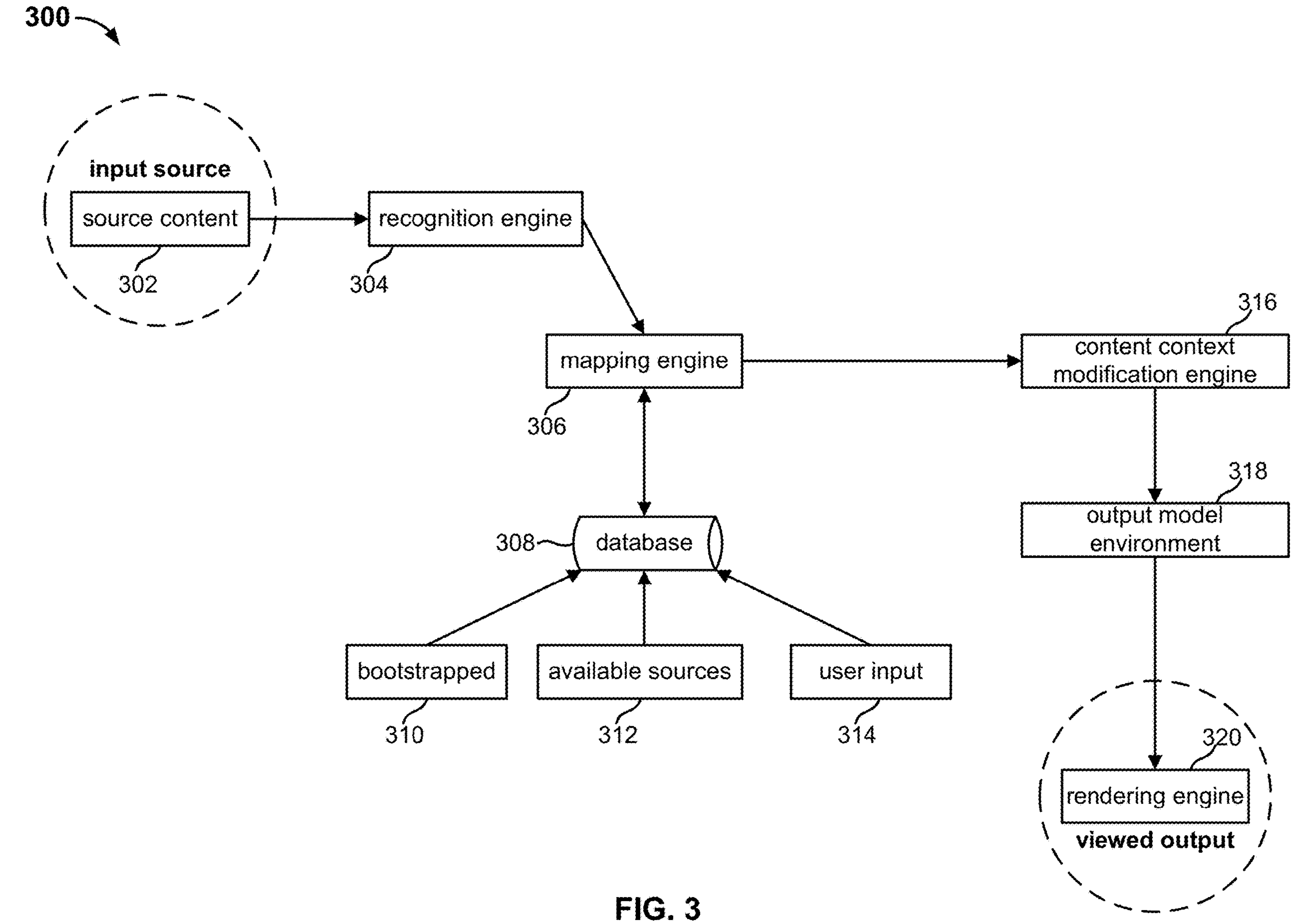
FIG. 3 is a block diagram illustrating an embodiment of the architecture of the disclosed content distribution platform based on context abstraction.

FIG. 3 is a block diagram illustrating an embodiment of the architecture of the disclosed content distribution platform based on context abstraction. This architecture provides novel techniques for creating, re-imagining, remastering, streaming, and rendering digital content. The various blocks of content distribution platform 300, for example, may be configured to perform corresponding steps of process 200 of FIG. 2. Block 302 comprises source content obtained from an input source. In various embodiments, the input source may comprise an imaging device (such as a camera) or may comprise existing multi-media content. Block 304 comprises a recognition engine configured to identify one or more elements and/or characteristics of input source content 302. That is, recognition engine 304 contextualizes source content 302. In various embodiments, recognition engine 304 may be configured to identify features, objects, background, illumination environment, etc., within input source content 302 using any combination of one or more standard and proprietary machine vision methods and/or assisted by human input.

Block 306 comprises a mapping engine configured to correlate and map the elements and/or characteristics identified by recognition engine 304 to the best matches available from an existing database 308 in which object specifications comprise prescribed computational space based representations. In some embodiments, mapping engine 306 is further configured to determine relative positions and orientations of identified objects within the model environment or scene representing the input source content. In many cases, objects in database 308 may need to be morphed or modified through available parameterization to match identified objects. In cases in which a suitably close match cannot be identified, an object may be substituted for by a best guess. Alternatively, an object and its associated properties may be created on an ad hoc basis from an analysis of source content 302 (e.g., by extracting geometry and texture) and submitted into database 308 for use during matching and mapping. In some cases, the correlation and/or mapping performed by mapping engine 306 is at least in part assisted by human input. In many cases, the environment or scene representing the input source content modeled by mapping engine 306 comprises little, if any, of the original data comprising input source content 302 since the modeled environment or scene comprises database object based representations of content. Thus, input source content 302 is effectively virtualized or re-imagined.

Block 308 comprises a database comprising an archive of available master objects and their associated properties. The depth and complexity of database 308 increases over time as it is populated as more and more data becomes available. An object entry in database 308 may comprise any appropriate and applicable parameters for specifying the object. For example, an object specification may include data comprising geometry (e.g., shape and size), surface texture, optical response to illumination, and/or any additional properties associated with the object (e.g., brand name, date and location of origin of manufacture, material properties, etc.). In some embodiments, object properties are parameterized to the extent possible to broaden the class of objects that can be represented by a given master object. Database 308 may be populated using any one or more appropriate techniques, some examples of which are depicted in FIG. 3. For instance, data comprising database 308 may be bootstrapped 310. That is, an object model may be created by directly extracting relevant data from input source content 302. Further, data comprising database 308 may be extracted from available sources 312. That is, object data may be extracted from other existing sources of image and/or video content. Moreover, data comprising database 308 may at least in part be entered by a user 314. That is, object data may be provided by user input comprising, for example, modeled/simulated data and/or data obtained via direct scanning and/or imaging of physical objects. Database 308 stores data associated with frequently appearing objects that can be used to generate content and adaptively improves over time as more objects and/or associated properties are learned.

Block 316 comprises a content context modification engine configured to modify and/or customize the environment or scene modeled by mapping engine 306 according to desired performance criteria. For example, the modeled environment may be altered by modifying objects, substituting objects with alternatives, and/or removing objects altogether. Moreover, the lighting of the modeled environment (e.g., lighting type and position, luminance, chromaticity, etc.) may be modified. In addition, perceived performance errors in the modeled environment or scene may be appropriately corrected as applicable. In the case of human subjects (i.e., parameterized master objects representing people in the source content), for instance, problems in gaze, appearance, etc., may be corrected. Furthermore, alternative camera positions/perspectives may be introduced into the modeled environment, for example, in addition to or instead of a default virtual camera appropriately located in a position to recreate a perspective defined by the source content.

Block 318 represents providing or outputting the modeled environment, for example, to a (requesting) client or destination device at which the modeled environment is desired to be rendered. Instead of original source content 302 being provided, parameters defining objects comprising the model representing source content 302 are delivered. Such a model environment specification may include, for example, object identifications, relative positions, and orientations; background and lighting environment specifications; camera position; etc. In some embodiments, a subset of the object database needed to create the modeled scene is provided. Alternatively, a copy of the subset of the object database needed to create the modeled scene may already be available at the client site or destination device to which the model environment is delivered and thus need not be provided. In some embodiments, block 318 includes storing a specification of the modeled environment or scene, e.g., for later distribution.

Block 320 comprises a rendering engine configured to render the environment or scene defined by the model at an output device (e.g., a flat panel display) with the characteristics of the objects referenced to the properties provided by the object database. Best in class techniques from the computer graphics industry may be applied by rendering engine 320 when rendering a scene. The subset of the object database needed to render the scene may be accessed by rendering engine 320 through a local copy or through direct access to database 308. In many cases, the scene is rendered by rendering engine 320 with a quality that is matched to the maximum quality performance achievable by the output device, i.e., is optimally matched to the display format, color performance, frame rate, etc., of the output device. Moreover, the scene rendered by rendering engine 320 may be personalized or customized based on a user and/or profiling of a user of the output device.

The described techniques for content distribution based on context abstraction offer numerous benefits. A high quality viewing experience may be delivered regardless of the quality of the source content and even when the source content is significantly degraded, e.g., due to compression artifacts or other noise. In many cases, the source content only has to be of sufficient quality for recognition engine 304 to identify features, objects, and background types. For example, in some cases, six bits of color per pixel in the source content are sufficient rather than thirty bits. Moreover, compression based block artifacts are in most cases acceptable; thus, very high compression ratios via traditional methods may be used to store the source content.

A scene captured by a common user using a device with consumer grade sensors having limited dynamic range is not only of relatively low resolution/quality but also is typically filmed without proper lighting or environmental conditions. However, using the disclosed techniques, viewed content can still be very high quality. Once an object is recognized, local tone correction can be applied, and highlights saturating an image can be corrected naturally when the scene is relit. Similarly, any other perceived imperfections can be corrected in or removed from the scene. For example, image stabilization as well as post processing to correct for performance errors may be introduced as applicable. With respect to a human subject, for instance, gaze may be corrected, closed eyes may be opened, stray hair may be removed, etc.

In various embodiments, content may be edited and/or re-imagined with any number of alternative visual qualities (e.g., lighting, surface characteristics, camera perspective, etc.) than originally intended from the source, and new and/or different content may be introduced. For example, a scene may be re-rendered with an advertiser's content such as brands, images, products, etc. Moreover, content may be personalized or customized based on an end user. Since object models may be specified in 3D in database 308, corresponding content may be naturally rendered in 3D if desired. Conversely, content may be rendered as a cartoon (e.g., in anime style) if desired.

For many applications, the disclosed content distribution techniques significantly reduce required communication bandwidth, for example, compared to traditional video codec approaches. Ultra-low bandwidth is especially feasible with fairly static scenes since object motion is the only required data that needs to be communicated. For example, video conferencing applications (such as telepresence, video chat, mobile video calls, etc.) are particularly well-suited for the disclosed platform. Source content from a low quality webcam, for instance, may be rendered in a UHD enabled telepresence conference room in cinematic quality. In addition to providing an ultra-low bandwidth solution for many applications, the disclosed content distribution techniques facilitate cinematic quality content creation at very low cost and overhead and without requiring expertise by an end user. Existing content may be easily re-imagined and/or remastered in limitless ways. For example, any archived image or video source may be rendered beautifully with cinematic quality on a UHD display. Additional applicable fields in which the disclosed techniques may be especially relevant include applications in the gaming, entertainment, and education industries as well as in any other industry in which efficient content distribution is paramount.

The described content contextualization platform is furthermore amenable to search applications, particularly contextual based image and video searches. A search may be conducted by searching for something according to one or more object definition criteria. Alternatively, a search may be conducted by creating content that best matches the search criteria. Content may be created, for instance, by modifying something that is quite close already (e.g., by re-lighting, re-orienting, and/or color correction; object removal and/or editing; etc.). Searches may be efficiently conducted against a network of one or more databases (such as database 308) comprising content libraries of object assets.

The manner in which database objects are specified and stored in the described architecture moreover facilitates future proofing multi-media content libraries with respect to evolving display and viewing technologies and standards. Further, content generation in 2D and 3D is easily supported since many database objects are inherently specified in 3D. Additionally, multi-scale object databases may be linked, facilitating support of an "infinite zoom" feature allowing advanced zooming, possibly down to even micro-scale and nano-scale levels.

In addition to the aforementioned advantages and applications, market trends in display technology are anticipated to favor the disclosed content distribution techniques based on context abstraction. To accommodate emerging display technologies, a new paradigm for content distribution will be imperative. The disclosed techniques provide one such architecture that is not only viable and scalable but also economic and resource efficient.

As described, the disclosed architecture comprises a low bandwidth content distribution platform that provides a high quality rendering of content at a destination device. A scene definition, such as output by block 318 of FIG. 3, comprises a low bandwidth communication of object and/or parameter specifications defining the scene. At a destination device, the objects and/or parameters referenced in a scene definition are rendered using corresponding definitions of the objects and/or parameters available via a database, such as database 308 of FIG. 3 and/or a local version thereof. In some embodiments, a version of a scene rendered at a destination device is constrained by the availability of object and/or parameter definitions in a local version of the database.

Figure 4:
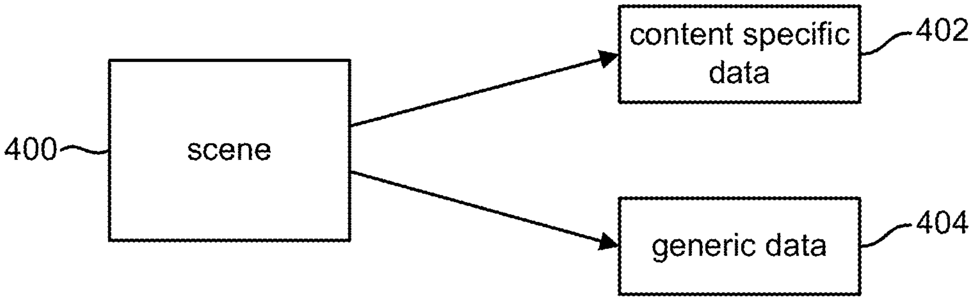
FIG. 4 is a block diagram illustrating an embodiment of the types of data comprising a scene.

FIG. 4 is a block diagram illustrating an embodiment of the types of data comprising a scene. Scene 400 may comprise image, audio, video, and/or other multimedia content. In some cases, scene 400 comprises a modeled scene, such as a scene output by any of blocks 306, 316, and 318 of FIG. 3. As depicted, scene 400 comprises two classes of data-content specific data 402 and generic data 404.

Content specific data 402 comprises data that specifically defines a prescribed scene 400. For example, content specific data 402 comprises a specification (e.g., an indexed list) of objects and/or parameters that are included in and/or define scene 400 and may further include data such as object locations or coordinates, object orientations, object motions or animations, scene lighting, camera poses and/or settings, audio data, etc.

Generic data 404 comprises general object and scene data that is not specific to any particular scene or content source but rather is generically defined for use with a plurality of scenes. For example, generic data 404 comprises data of database 308 of FIG. 3 and/or local versions of such a database available at various destination devices. Generic data 404 comprises general object and/or parameter definitions and may further include, for example, geometry data (e.g., mesh), material properties (e.g., the optical behavior of materials), surface textures (e.g., color and/or general appearances of object surfaces), other appearance data (e.g., size, shape, kinematic constraints), character information, etc.

Figure 5:
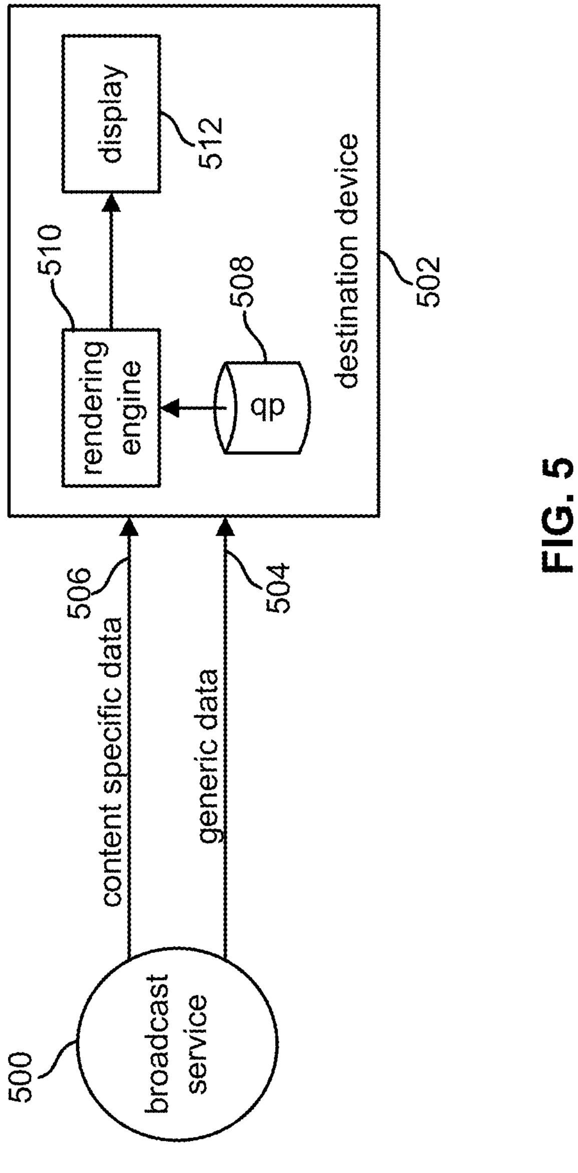
FIG. 5 is a block diagram illustrating an embodiment of communicating or broadcasting scene data.

FIG. 5 is a block diagram illustrating an embodiment of communicating or broadcasting scene data, such as the data comprising scene 400 of FIG. 4. In the given example, a broadcast server or service 500 is configured to communicate or stream scene data to one or more clients or destination devices 502 via a plurality of communication channels 504 and 506. In the given example, broadcasting scene data comprises partitioning the scene data into generic and content specific data and separately communicating generic data via high bandwidth channel 504 and content specific data via low bandwidth channel 506.

Generic data is communicated via high bandwidth communication channel 504 and populates a local object and scene definitions database 508 at destination device 502. In some embodiments, generic data is asynchronously communicated at a different time than when a scene that references the data is desired to be rendered at destination device 502. Alternatively, generic data may be synchronously communicated when a scene that references the data is desired to be rendered at destination device 502. Generic data populating local database 508 may be used to render a plurality of different, independent scenes or parts thereof at destination device 502. In some embodiments, broadcast service 500 multicasts generic data to a plurality of destination devices to simultaneously populate or update corresponding local databases.

Content specific data is communicated to destination device 502 via a relatively lower bandwidth communication channel 506 compared to communication channel 504 used for generic data. Content specific data is generally light since it is comprised primarily of sparse types of data such as an index of object names, coordinates, a high level description of the environment, etc. In some embodiments, content specific data comprises a script. Due to its compact form, content specific data may be communicated live, on-demand, or at a desired time of broadcast with a relatively small amount of bandwidth consumption.

Destination device 502 comprises a host system at which a scene is rendered. For example, destination device 502 may comprise a home multimedia server and storage system. In the given example, destination device 502 comprises local database 508, rendering engine 510, and display 512. Although not depicted, destination device 502 may include other appropriate components such as one or more input/output interfaces.

Local database 508 grows and improves over time as more and more generic object and scene data is added to the database. Definitions in database 508 may comprise two-dimensional and/or three-dimensional data, and database 508 may be hierarchically and/or categorically organized or indexed. A local version of database 508 may comprise a subset of a global database (e.g., database 308 of FIG. 3) and may be synced with respect to such a master database. In some embodiments, data is continuously updated and/or accumulated locally in database 508. Alternatively, data may be locally updated in database 508 periodically or at prescribed times. Data accumulated in local database 508 may comprise independently entered data and/or data extracted or generated from encoded scenes. Once database 508 has reached a large enough size, the amount of generic data generated from a particular scene is in many cases trivial, if any at all. That is, once database 508 has grown to become of sufficient size, it may inherently include the object and/or parameter definitions needed to comprehensively specify a scene. In such cases, generic data may not need to be generated or extracted from specific scenes to further populate database 508 since the database already includes such data or comparable data.

At least a sufficient amount of data needs to be accumulated in local database 508 ahead of time before any scene may be decoded and rendered since rendering engine 510 employs definitions stored in database 508 to render a scene. A scene is rendered by rendering engine 510 at destination device 502 on display 512. In some embodiments, rendering engine 510 comprises rendering engine 320 of FIG. 3. The rendering performed by rendering engine 510 may include, for example, object arrangement for scene construction, motion and animation, customization, etc. Specifically, rendering engine 510 employs content specific data to reconstruct a scene using definitions (e.g., for geometries, materials, textures, etc.) available in local database 508. That is, rendering engine 510 generates or renders a scene by configuring corresponding generic object and/or parameter definitions obtained from database 508 according to instructions specified by the content specific data. One or more aspects of a rendered scene, such as display format, lighting, color, camera perspective, object placement, etc., may be customized by rendering engine 510 for a given destination device 502 or user thereof. A scene rendered on display 512 may comprise, for example, a viewable image and/or other visual content such as video frames and may also include audio and/or other multimedia content. In some embodiments, a rendered scene is of photoreal visual quality.

In some embodiments, a scene rendered at destination device 502 is constrained by the locally available data in database 508. In some such cases, for instance, a rendered scene at destination device 502 only includes objects and/or parameters locally defined in database 508. If an exact match for an object or parameter specification is not locally available, any one or more appropriate algorithms and/or criteria may be employed to select a close or best match (e.g., based on category, size, shape, color, etc.). As an example, consider that the content specific data of a scene includes a specification for a sofa but that a local database does not include any sofa objects. In this example, a chair object may be selected instead by traversing a furniture category hierarchy of the local database to identify a close or best match. Thus, a scene may be rendered at a destination device differently than an intended original or master version of the scene. Moreover, the same scene as specified by the same content specific data may be rendered differently at different destination devices based on the object definitions available at their respective local databases. In some embodiments, regardless of the exact content rendered at each destination device (e.g., sofa vs. chair), content is rendered at a user selectable quality or at a highest quality supported by each destination device. Therefore, the actual content and especially the details comprising a rendered scene may vary across different destination devices based on the availability of definitions in the corresponding local databases. Nevertheless, a scene may be rendered at each destination device in full fidelity.

In some embodiments, content specific data defining a scene may be appropriately modified based on knowledge of the state of a local database at a destination device. For example, a server-side broadcast service may poll the local database of a destination device to determine its state and accordingly adjust or modify the content specific data of a scene before broadcasting or communicating it to the destination device so that it only includes references to object and/or parameter definitions available at the destination device. Content specific data may similarly instead be appropriately modified at the destination device based on available object and/or parameter definitions in a local database. Thus, an interpreter module may be incorporated server-side or client-side to adapt content specific data defining a scene to conform to a current state of a local database. Alternatively, needed definitions to render a scene that are known or found to not be available at a local database may be pushed from the server to a client or pulled by a client from the server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for rendering a scene, comprising:

receiving a scene definition representing requested source content at a device, wherein the received scene definition comprises three-dimensional object references but not three-dimensional object definitions;

modifying the received scene definition at least in part according to a current state of a local database at the device, wherein the modified scene definition comprises three-dimensional object references to only locally available three-dimensional object definitions at the device and wherein at least one three-dimensional object referenced in the scene definition is substituted with a closest matching three-dimensional object available in the local database in the modified scene definition; and rendering the scene at the device according to the modified scene definition and one or more three-dimensional object definitions that are referenced in the modified scene definition, wherein the rendered scene represents the requested source content at the device.

2. The method of claim 1, wherein modifying the received scene definition comprises personalizing or customizing the received scene definition at the device for a user of the device.

3. The method of claim 1, wherein the scene definition is rendered differently at different devices based on three-dimensional object definitions available at their respective local databases.

4. The method of claim 1, wherein the scene definition and three-dimensional object definitions populating the local database are separately received at the device via different communication channels.

5. The method of claim 1, wherein the scene definition is received at the device via a relatively low bandwidth communication channel and wherein three-dimensional object definitions populating the local database are received at the device via a relatively high bandwidth communication channel.

6. The method of claim 1, wherein three-dimensional object definitions populating the local database are asynchronously received at the device at a different time than when the scene definition is received at the device.

7. The method of claim 1, wherein the scene definition comprises a script with instructions for rendering.

8. The method of claim 1, wherein the scene definition comprises a list of objects and associated parameters.

9. The method of claim 1, wherein the scene definition comprises specifications of one or more of: object locations or coordinates, object orientations, object motions or animations, scene lighting, camera poses and setting, and audio data.

10. The method of claim 1, wherein three-dimensional object definitions populating the local database facilitate generating local renderings at the device.

11. The method of claim 1, wherein three-dimensional object definitions populating the local database are used to render a plurality of different, independent scenes including the scene.

12. The method of claim 1, wherein the local database comprises at least a subset of a global database.

13. The method of claim 1, wherein the local database is synced with respect to a master database.

14. The method of claim 1, wherein the local database is updated at prescribed times.

15. The method of claim 1, wherein the scene is rendered at the device in a user selectable quality or in a highest quality supported by the device.

16. The method of claim 1, wherein the scene is rendered at the device in photoreal visual quality.

17. The method of claim 1, wherein at least one three-dimensional object referenced in the scene definition is substituted with a different three-dimensional object in the modified scene definition.

18. A system for rendering a scene, comprising:

A processor configured to receive a scene definition representing requested source content at a device, wherein the received scene definition comprises three-dimensional object references but not three-dimensional object definitions;

modify the received scene definition at least in part according to a current state of a local database at the device, wherein the modified scene definition comprises three-dimensional object references to only locally available three-dimensional object definitions at the device and wherein at least one three-dimensional object referenced in the scene definition is substituted with a closest matching three-dimensional object available in the local database in the modified scene definition; and render the scene at the device according to the modified scene definition and one or more three-dimensional object definitions that are referenced in the modified scene definition, wherein the rendered scene represents the requested source content at the device, and a memory coupled to the processor and configured to provide the processor with instructions.

19. The system of claim 18, wherein to modify the received scene definition comprises to personalize or customize the received scene definition at the device for a user of the device.

20. The system of claim 18, wherein the scene definition is rendered differently at different devices based on three-dimensional object definitions available at their respective local databases.

21. The system of claim 18, wherein the scene definition and three-dimensional object definitions populating the local database are separately received at the device via different communication channels.

22. The system of claim 18, wherein the scene definition is received at the device via a relatively low bandwidth communication channel and wherein three-dimensional object definitions populating the local database are received at the device via a relatively high bandwidth communication channel.

23. The system of claim 18, wherein three-dimensional object definitions populating the local database are asynchronously received at the device at a different time than when the scene definition is received at the device.

24. The system of claim 18, wherein the scene definition comprises a script with instructions for rendering.

25. The system of claim 18, wherein the scene definition comprises a list of objects and associated parameters.

26. The system of claim 18, wherein the scene definition comprises specifications of one or more of: object locations or coordinates, object orientations, object motions or animations, scene lighting, camera poses and setting, and audio data.

27. The system of claim 18, wherein three-dimensional object definitions populating the local database facilitate generating local renderings at the device.

28. The system of claim 18, wherein three-dimensional object definitions populating the local database are used to render a plurality of different, independent scenes including the scene.

29. The system of claim 18, wherein the local database comprises at least a subset of a global database.

30. The system of claim 18, wherein the local database is synced with respect to a master database.

31. The system of claim 18, wherein the local database is updated at prescribed times.

32. The system of claim 18, wherein the scene is rendered at the device in a user selectable quality or in a highest quality supported by the device.

33. The system of claim 18, wherein the scene is rendered at the device in photoreal visual quality.

34. The system of claim 18, wherein at least one three-dimensional object referenced in the scene definition is substituted with a different three-dimensional object in the modified scene definition.

35. A computer program product for rendering a scene embodied in a non-transitory computer readable storage medium and comprising computer instructions for:

receiving a scene definition representing requested source content at a device, wherein the received scene definition comprises three-dimensional object references but not three-dimensional object definitions;

modifying the received scene definition at least in part according to a current state of a local database at the device, wherein the modified scene definition comprises three-dimensional object references to only locally available three-dimensional object definitions at the device and wherein at least one three-dimensional object referenced in the scene definition is substituted with a closest matching three-dimensional object available in the local database in the modified scene definition; and rendering the scene at the device according to the modified scene definition and one or more three-dimensional object definitions that are referenced in the modified scene definition, wherein the rendered scene represents the requested source content at the device.

36. The computer program product of claim 35, wherein modifying the received scene definition comprises personalizing or customizing the received scene definition at the device for a user of the device.

37. The computer program product of claim 35, wherein the scene definition is rendered differently at different devices based on three-dimensional object definitions available at their respective local databases.

38. The computer program product of claim 35, wherein the scene definition and three-dimensional object definitions populating the local database are separately received at the device via different communication channels.

39. The computer program product of claim 35, wherein the scene definition is received at the device via a relatively low bandwidth communication channel and wherein three-dimensional object definitions populating the local database are received at the device via a relatively high bandwidth communication channel.

40. The computer program product of claim 35, wherein three-dimensional object definitions populating the local database are asynchronously received at the device at a different time than when the scene definition is received at the device.

41. The computer program product of claim 35, wherein the scene definition comprises a script with instructions for rendering.

42. The computer program product of claim 35, wherein the scene definition comprises a list of objects and associated parameters.

43. The computer program product of claim 35, wherein the scene definition comprises specifications of one or more of: object locations or coordinates, object orientations, object motions or animations, scene lighting, camera poses and setting, and audio data.

44. The computer program product of claim 35, wherein three-dimensional object definitions populating the local database facilitate generating local renderings at the device.

45. The computer program product of claim 35, wherein three-dimensional object definitions populating the local database are used to render a plurality of different, independent scenes including the scene.

46. The computer program product of claim 35, wherein the local database comprises at least a subset of a global database.

47. The computer program product of claim 35, wherein the local database is synced with respect to a master database.

48. The computer program product of claim 35, wherein the local database is updated at prescribed times.

49. The computer program product of claim 35, wherein the scene is rendered at the device in a user selectable quality or in a highest quality supported by the device.

50. The computer program product of claim 35, wherein the scene is rendered at the device in photoreal visual quality.

51. The computer program product of claim 35, wherein at least one three- dimensional object referenced in the scene definition is substituted with a different three-dimensional object in the modified scene definition.

* * * * *